United States Patent
Govindaraju et al.

(10) Patent No.: US 11,507,403 B2
(45) Date of Patent: Nov. 22, 2022

(54) HOST COMPUTING SYSTEMS DETERMINATION TO DEPLOY VIRTUAL MACHINES BASED ON DISK SPECIFICATIONS

(71) Applicant: VMWARE, INC., Palo Alto, CA (US)

(72) Inventors: Agila Govindaraju, Bangalore (IN); Ravi Kasha, Bangalore (IN); Ashish Dhar, Bangalore (IN); Akshata Sampagavi, Bangalore (IN); Yavor Boychev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 217 days.

(21) Appl. No.: 16/390,022

(22) Filed: Apr. 22, 2019

(65) Prior Publication Data
US 2020/0241909 A1 Jul. 30, 2020

(30) Foreign Application Priority Data
Jan. 24, 2019 (IN) .............................. 201941003009

(51) Int. Cl.
*G06F 9/455* (2018.01)
*G06F 9/50* (2006.01)
*G06F 3/06* (2006.01)

(52) U.S. Cl.
CPC ........ *G06F 9/45558* (2013.01); *G06F 3/0604* (2013.01); *G06F 3/067* (2013.01); *G06F 3/0631* (2013.01); *G06F 3/0664* (2013.01); *G06F 9/5016* (2013.01); *G06F 9/5044* (2013.01); *G06F 2009/4557* (2013.01); *G06F 2009/45583* (2013.01); *G06F 2009/45595* (2013.01)

(58) Field of Classification Search
CPC .... G06F 9/45558; G06F 3/0604; G06F 3/063; G06F 3/0664; G06F 3/067; G06F 9/5016; G06F 9/5044
USPC ......................................................... 709/226
See application file for complete search history.

(56) References Cited

U.S. PATENT DOCUMENTS

| 9,100,343 | B1* | 8/2015 | Riordan | H04L 41/5048 |
|---|---|---|---|---|
| 10,353,619 | B1* | 7/2019 | Jha | G06F 3/065 |
| 2013/0297964 | A1* | 11/2013 | Hegdal | G06F 11/0712 714/2 |
| 2017/0206107 | A1* | 7/2017 | Guha | G06F 3/0647 |
| 2019/0266006 | A1* | 8/2019 | Cao | G06F 9/45558 |
| 2020/0042392 | A1* | 2/2020 | Alluboyina | G06F 9/5033 |

* cited by examiner

*Primary Examiner* — Kevin S Mai

(57) ABSTRACT

Techniques for determining host computing systems to deploy virtual machines based on disk specifications are disclosed. In one example, a blueprint to deploy a virtual machine in a cloud computing environment may be received. Further, disk specifications required to deploy the virtual machine may be retrieved from the blueprint. Furthermore, candidate storage entities that support the retrieved disk specifications may be determined. A host computing system that has connectivity to the candidate storage entities may be determined. the determined host computing system may be recommended to deploy the virtual machine.

18 Claims, 12 Drawing Sheets

| | |
|---|---|
| NAME * | FAST STORAGE |
| STORAGE POLICY | PREFLIGHT STORAGE POLICY ←—506 |
| DATASTORE * | SHARED_VCO_DGC_DEV1 ←—504 |
| PROVISIONING TYPE | THICK |
| SHARES | HIGH        2000 |
| LIMIT IOPS | 1000 |
| DISK MODE | INDEPENDENT - PERSISTENT |
| | ☐ SUPPORT ENCRYPTION |
| | ( FAST X )—502 |
| CAPABILITY TAGS | ENTER CAPABILITY TAGS |

HOST COMPUTING SYSTEMS DETERMINATION TO DEPLOY VIRTUAL MACHINES BASED ON DISK SPECIFICATIONS

RELATED APPLICATIONS

Benefit is claimed under 35 U.S.C. 119(a)-(d) to Foreign Application Serial No. 201941003009 filed in India entitled "HOST COMPUTING SYSTEMS DETERMINATION TO DEPLOY VIRTUAL MACHINES BASED ON DISK SPECIFICATIONS", on Jan. 24, 2019, by VMWARE, INC., which is herein incorporated in its entirety by reference for all purposes.

TECHNICAL FIELD

The present disclosure relates to cloud computing environments and, more particularly, to determine host computing systems to deploy virtual machines in a cloud computing environment based on disk specifications.

BACKGROUND

In cloud computing design, numerous tools exist to create and deploy applications (e.g., applications including one or more virtual machines connected to each other in a particular topology) in cloud environments or virtual computing environments. For example, application provisioning tools facilitate cloud computing designers to create and standardize application deployment topologies on infrastructure clouds. Some application provisioning tools include graphical user interfaces (GUIs) that enable designers to generate application deployment topologies called application blueprints, which define structures and configurations of the applications. Once a blueprint is designed to define an application, the blueprint can be used to deploy multiple instances of the application to many cloud environments. VMware vRealize Automation® can automate the delivery of personalized infrastructure, applications, and custom information technology (IT) services using the blueprints. An administrator can deploy multiple instances of the application using already created blueprints without a need to specify the configuration properties. Clients (e.g., customers, business groups, tenants, enterprises, and the like) of such cloud computing environments may seek efficient and cost-effective management, administration, and deployment of virtual machines within cloud-computing facilities or deployment environments.

BRIEF DESCRIPTION OF THE DRAWINGS

FIG. 5A illustrates an example screenshot, depicting example cloud specific properties that are captured in a storage profile;

Figure 1:
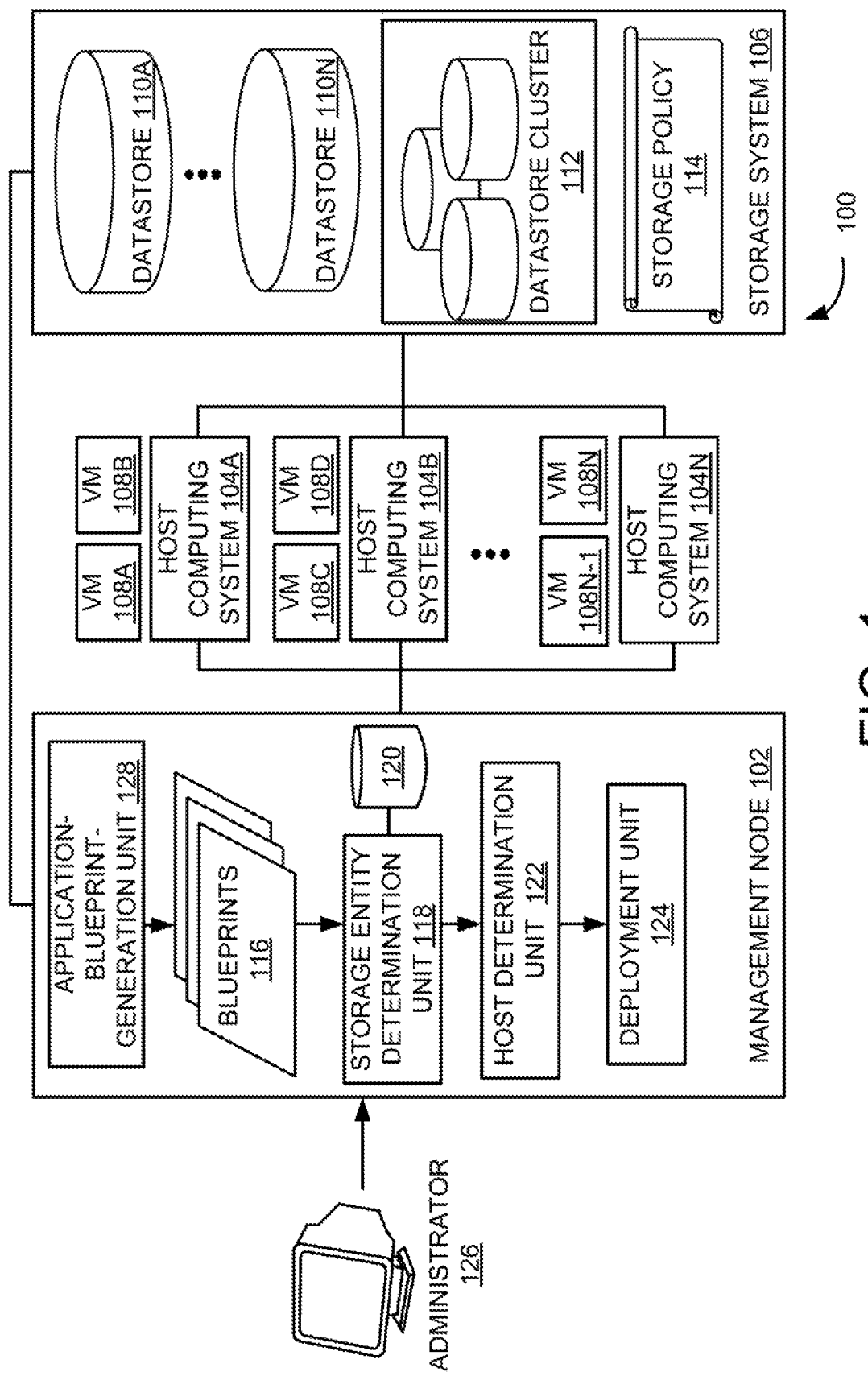
FIG. 1 is a block diagram of an example system for deploying virtual machines on host computing systems within one or more cloud computing environments based on disk specifications.

The drawings described herein are for illustration purposes only and are not intended to limit the scope of the present subject matter in any way.

DETAILED DESCRIPTION

Embodiments described herein may provide an enhanced computer based and network-based method, technique, and system for determining host computing systems to deploy virtual machines based on disk specifications. In the cloud computing environment, a management server/node may communicate with multiple clients, with each client (i.e., a client group having a group of members) associated with resource reservations to accommodate virtual machines. A resource reservation may allocate a share of memory, central processing unit (CPU), and storage resources on a compute resource for a client to use. In such an environment, a corresponding number of virtual machines can be created for each client and the resources may be allocated for each virtual machine to support application operations. For example, the client may be a customer, a business group, a tenant, an enterprise, and the like.

An administrator can create blueprints that can only be entitled to users in a specific client. When a client's member requests a virtual machine, the virtual machine can be provisioned according to the specifications in the blueprint, such as a CPU, memory, and storage. An example of a blueprint may specify a Windows 7 developer workstation with one CPU, 2 GB of memory, and a 30 GB hard disk.

In a virtual data center, applications can be deployed based on the blueprints, which describe computing resources and application components to be executed on the computing resources. For example, a blueprint can describe one or more virtual machines and software application components to be executed on the virtual machines. Administrators (e.g., IT professionals) may manage cloud computing resources using advanced management software, such as vRealize Automation® and vCloud® Automation Center™ from VMware. Such management software may provide a secure portal where authorized administrators, developers, and/or business users can request new IT services and perform management operations, such as provisioning and configuration of applications.

When applications (i.e., applications including one or more virtual machines connected to each other in a particular topology) are deployed to a cloud infrastructure, a number of errors may occur in connection with provisioning of virtual computing infrastructure, where the cloud computing system is looking to find a placement for the application which satisfies all compute, network and storage requirements. An example of such requirement is that the selected host computing system where the virtual machine would be placed and the selected storage entities where the disks associated with the virtual machine would be placed should have networking connectivity. This problem may become multi fold when various disks that are part of the blueprint definition are requesting different disk specifications and may potentially cause deployment failures.

Examples described herein may determine a host computing system to deploy a virtual machine based on various disk specifications. In one example, a method may include receiving a blueprint to deploy a virtual machine in a cloud computing environment, retrieving disk specifications (e.g., constraints) required to deploy the virtual machine from the blueprint, matching the retrieved disk specifications with storage profiles (e.g., predefined) associated with a plurality of storage entities, determining candidate storage entities that support the retrieved disk specifications based on the matching, and determining a host computing system that has connectivity to the candidate storage entities. The determined host computing system can be used to deploy the virtual machine. Thus, a right host computing system to deploy the virtual machine may be automatically determined such that the host computing system is to have access to all the storage entities (e.g., datastores) that support various disk specifications of the virtual machine.

Examples disclosed herein may be implemented in connection with cloud computing environments that use virtual machines. A virtual machine is a data computer node that operates with its own guest operating system (OS) on a host using resources of the host virtualized by virtualization software.

System Overview and Examples of Operation

FIG. 1 is a block diagram of an example system 100 for deploying virtual machines (e.g., VMs 108A-108N) on host computing systems 104A-104N within one or more cloud computing environments based on disk specifications. Cloud computing environments (e.g., virtualized cloud computing environments) may include one or more computing platforms that support the creation, deployment, and management of virtual machine-based cloud applications. One such platform is the vCloud® Automation Center, which is commercially available from VMware.

As shown in FIG. 1, system 100 may include a management node 102 and host computing systems 104A-104N that are in communication with management node 102. Management node 102 may refer to a computing device, or computer program (i.e., executing on a computing device), that provides some service to host computing systems 104A-104N. Management node 102 may connect to the cloud deployment platforms over a network (e.g., over a local-area network, wide-area network, wireless network, or the like).

In cloud computing environments, clusters of host computing systems 104A-104N may be used to support clients for executing various applications. Further, a number of virtual machines can be created for each client and resources (e.g., CPU, memory, storage, and the like) may be allocated for each virtual machine to support application operations. A virtual machine is an emulation of a particular computer system that operates based on a particular computer architecture, while functioning as a real or hypothetical computer. Virtual machine implementations may involve specialized hardware, software, or a combination of both.

In the illustrated example of FIG. 1, an application runs on a virtual machine (e.g., 108A that in turn running on a host computing system (e.g., 104A)) in a deployment environment corresponding to a client. Thus, in FIG. 1, virtual machines 108A-108N are depicted as instantiated in the cloud computing environment by management node 102. Further, system 100 may include storage system 106 communicatively coupled to host computing systems 104A-104N via a network (e.g., over a local-area network, wide-area network, wireless network, or the like) to store virtual machine files, which is explained in FIG. 2.

Figure 2:
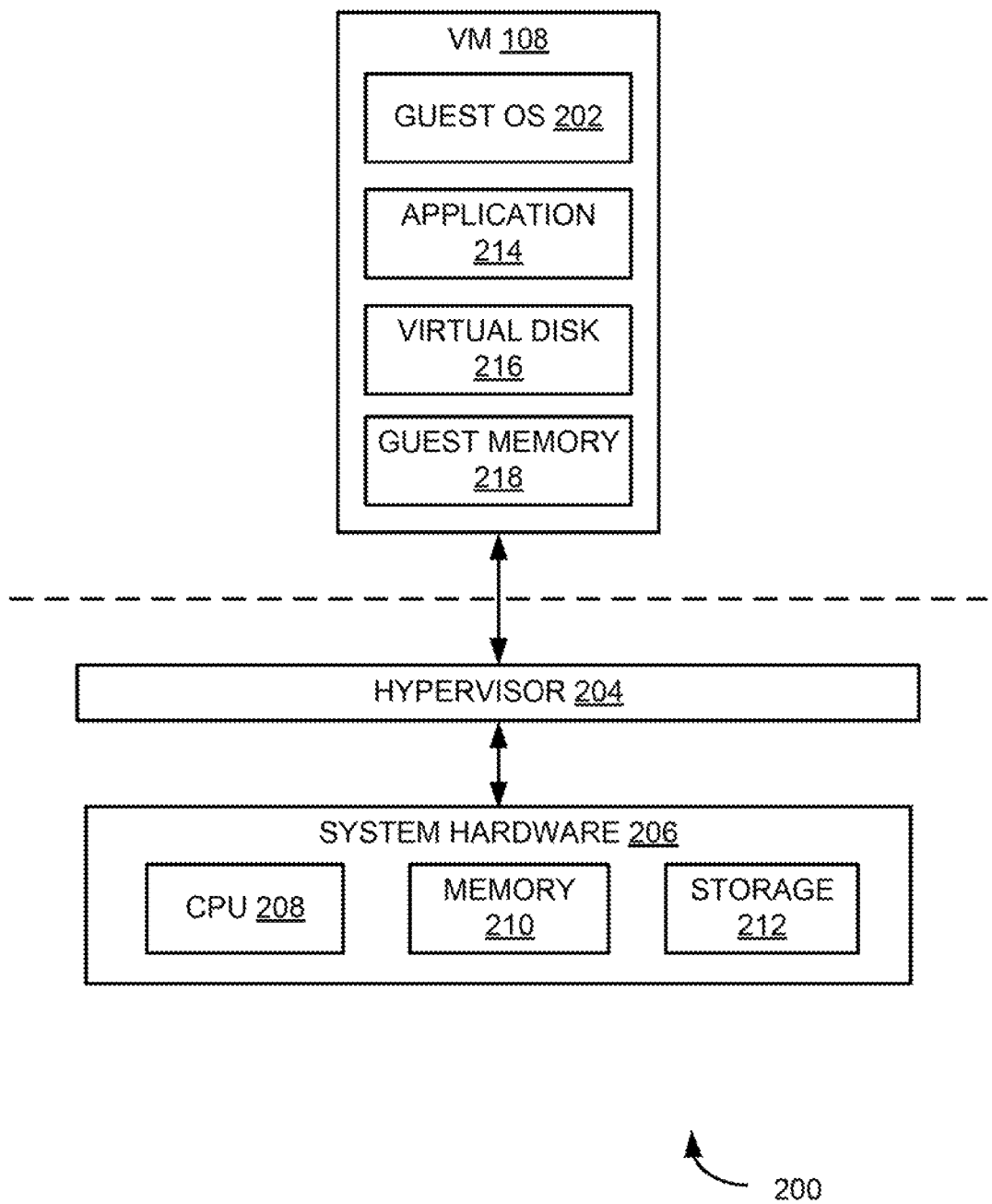
FIG. 2 is a block diagram illustrating a virtualized computer system with which one or more embodiments of the present disclosure may be utilized.

Referring now to FIG. 2, which is a block diagram illustrating an example virtualized computer system 200 with which one or more embodiments of the present disclosure may be utilized. Virtual machines 108 may run on top of a hypervisor 204, which is a software interface layer that abstracts system hardware 206 (e.g., host computing system 104 of FIG. 1) into virtualized hardware, thereby enabling sharing of system hardware 206 of virtualized computer system 200 amongst virtual machines 108. Hypervisor 204 may act as an interface between virtual machine 108 and system hardware 206 for executing virtual machine-related instructions and for transferring data to and from machine memory 210, processor(s) 208, storage 212, and the like.

Further, when any of virtual machines 108 is created, a certain amount of resources may be allocated to virtual components (e.g., virtual disk 216 and/or guest memory 218) of virtual machine 108, such as to support guest OS 202 and applications 214. For example, the allocated resources may include CPU resources (e.g., processors), memory resources (e.g., guest memory 218 supported by random access memory), network resources (e.g., access networks, group of ports, etc.), and storage resources (e.g., virtual disk 216 supported by storage system 106 of FIG. 1), etc. In this example, storage resources may be allocated in the form of "virtual disk" 216, which may generally refer to virtual machine file or virtual machine files on a file system that appear as a single hard disk to guest OS 202. Virtual disk 216 may be used to store data relating to guest OS 202 and applications 214.

Referring back to FIG. 1, management node 102 may include an application-blueprint-generation unit 128 to generate blueprint 116 with specifications of compute resources, network resources, and storage resources. Blueprints 116 can be mapped to corresponding ones of the clients. For example, an administrator 126 may use an associated computing device to access management node 102 to create blueprints 116 that can be entitled to users in a specific client. The specifications of the storage resources may include a plurality of virtual disks (e.g., 216 of FIG. 2) with various disk specifications.

Further, management node 102 may include a storage-profile repository 120 to store a plurality of storage profiles associated with a plurality of storage entities in the cloud computing environment. Each storage profile may list storage capabilities of a storage entity (e.g., of a cloud service provider) that gets applied to the virtual disks deployed on that storage entity. The storage profiles may be created and stored either manually or through auto populating from the deployment environments. The storage entities may be selected from a group consisting of datastores 110A-N, datastores that are associated with/part of datastore clusters 112, datastores that are compatible with storage policies 114, or any combination thereof. Datastore may refer to a manageable storage entity, used as a repository for virtual machine files including log files, scripts, configuration files, virtual disks, and so on. Datastore cluster 112 may refer to a collection of datastores with shared resources and a shared management interface. Storage policy may refer to the rules that control which type of storage is provided for the virtual disks when the virtual disks are deployed within the storage entity. The storage policy may be used to identify candidate datastores or datastore clusters.

In one example, management node 102 may include a storage entity determination unit 118 communicatively coupled to storage-profile repository 120. During operation, storage entity determination unit 118 may receive a blueprint 116 to deploy a virtual machine in the cloud computing environment.

Further, storage entity determination unit 118 may retrieve disk specifications (e.g., associated with the virtual disks) required to deploy the virtual machine from blueprint 116. The disk specifications may include predefined user hints in blueprint 116. Example disk specifications may be selected from a group consisting of a storage-entity type, a storage-entity capacity, a data-reading rate, a data-writing rate, an access latency, an access failure rate, a failure frequency, support for data encryption, and a data persistency.

Furthermore, storage entity determination unit 118 may determine candidate storage entities that support the retrieved disk specifications using the storage profiles. In one example, storage entity determination unit 118 may retrieve the storage profiles associated with the plurality of storage entities from storage-profile repository 120, match the retrieved disk specifications (e.g., disk requirements in the form of disk constraints) with the retrieved storage profiles (e.g., storage profile capabilities expressed in the form of tags applied on the storage profile), and determine the candidate storage entities that support the retrieved disk specifications from the plurality of storage entities based on the matching. In this example, the storage entity determination unit 118 may match predefined tags (e.g., user hints) associated with the retrieved disk specifications with the retrieved storage profiles associated with the plurality of storage entities. Examples of predefined tags and storage profiles are explained with respect to FIGS. 4 and 5, respectively.

Also, management node 102 may include a host determination unit 122 communicatively coupled to storage entity determination unit 118. During operation, host determination unit 122 may determine a host computing system that has connectivity to the candidate storage entities. In one example, host determination unit 122 may map each disk specification in blueprint 116 to at least one candidate storage entity and determine the host computing system that has connectivity to each of the mapped candidate storage entities.

In another example, storage entity determination unit 118 may also determine a virtual disk (i.e., an existing virtual disk) in the cloud computing environment that needs to be attached to the virtual machine using blueprint 116. Further, storage entity determination unit 118 may determine a storage entity associated with the existing virtual disk. Then, host determination unit 122 may determine the host computing system that has connectivity to the candidate storage entities and the storage entity associated with the existing virtual disk.

In other examples, consider that a first host computing system and a second host computing system may be determined as having connectivity to the candidate storage entities and storage entity associated with the existing virtual disk (if any). In this example, a processor resource availability, a memory resource availability, and a network resource availability of the first and second host computing systems and storage resource availability of candidate storage entities may also be considered to provide recommendation to deploy the virtual machine on one of the first and second host computing systems.

Also, management node 102 may include a deployment unit 124 communicatively coupled to host determination unit 122. During operation, deployment unit 124 may deploy the virtual machine on the determined host computing system (e.g., based on the recommendation).

In the examples described in FIG. 1, management node 102 may comprise the vCenter Server™ and vSphere® program products, which are commercially available from VMware, Inc. An example of storage entity determination unit 118, host determination unit 122, and deployment unit 124 can be implemented in vRealize Automation®, vRealize Operations, vRealize Business, vCloud Automation Center, and/or the like that are offered by VMware. Storage entity determination unit 118, host determination unit 122, and deployment unit 124 can be implemented in Infrastructure as a Service (IaaS), which is a component that enables the provisioning of virtualized infrastructure components in a cloud-based computing environment. In other examples, any other suitable cloud computing platform may be used to implement storage entity determination unit 118, host determination unit 122, and deployment unit 124.

In one example, storage entity determination unit 118, host determination unit 122, and deployment unit 124 residing in management node 102 may be implemented as engines or modules comprising any combination of hardware and programming to implement the functionalities described herein. Each of storage entity determination unit 118, host determination unit 122, and deployment unit 124 can be a service process in the management application or can be an appliance running in the data center to cater multiple management applications in the cloud-based environment. For example, management application may be vSphere virtual center that is offered by VMware. Management application can be provided in a physical server, VM, or container.

In some examples, the functionalities described herein, in relation to instructions to implement functions of storage entity determination unit 118, host determination unit 122, and deployment unit 124 and any additional instructions described herein in relation to the storage medium, may be implemented as engines or modules comprising any combination of hardware and programming to implement the functionalities of the modules or engines described herein. The functions of storage entity determination unit 118, host determination unit 122, and deployment unit 124 may also be implemented by respective processor. In examples described herein, the processor may include, for example, one processor or multiple processors included in a single device or distributed across multiple devices.

Figure 3:
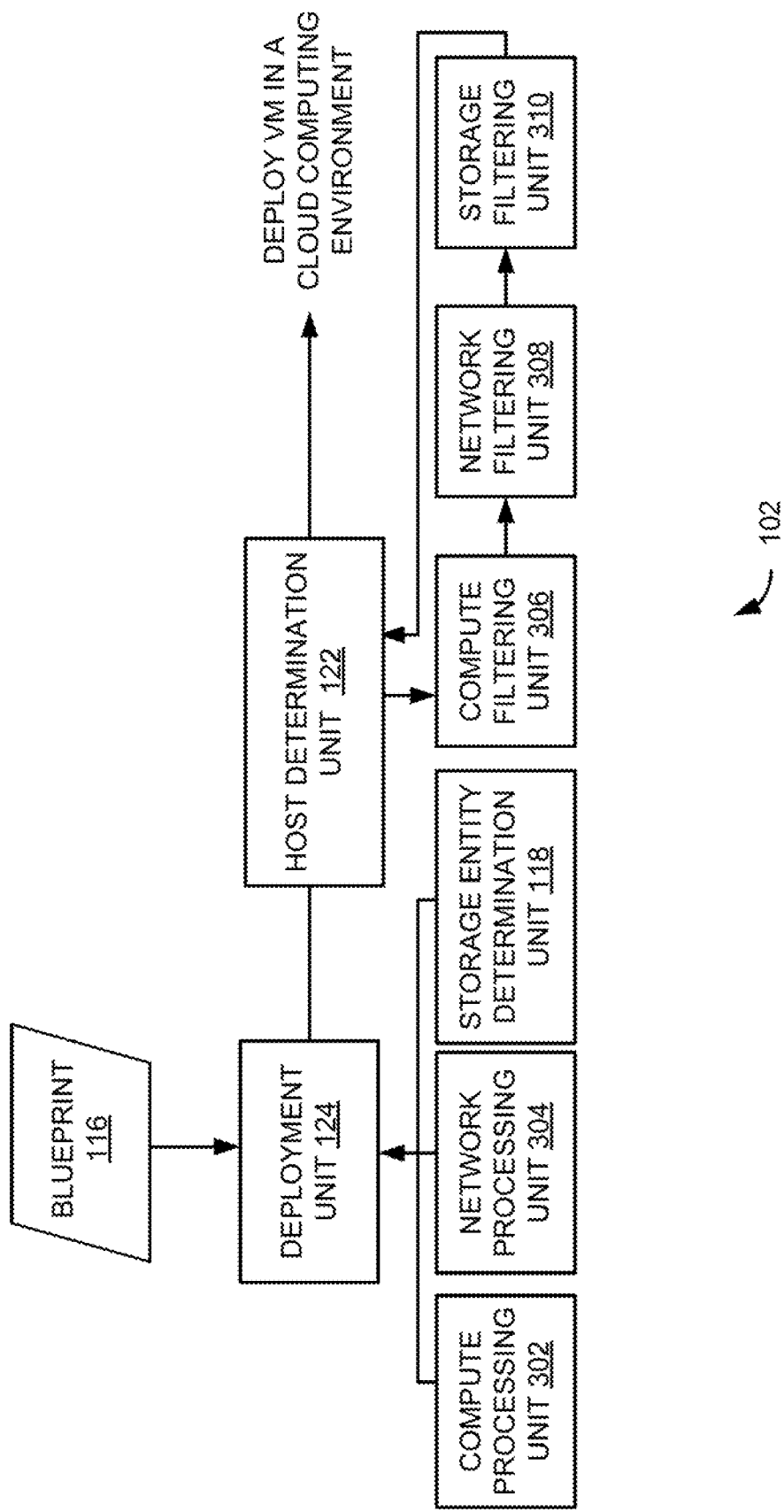
FIG. 3 illustrates an example block diagram of the management node of FIG. 1, depicting additional features.

FIG. 3 illustrates an example block diagram of management node 102 of FIG. 1, depicting additional features. As shown in FIG. 3, management node 102 may include a compute processing unit 302, a network processing unit 304, and storage entity determination unit 118 communicatively coupled to deployment unit 124. Further, management node 102 may include a compute filtering unit 306, a network filtering unit 308, and storage filtering unit 310 communicatively coupled to host determination unit 122. Further, host determination unit 122 may be in communication with deployment unit 124 to deploy the virtual machine in the cloud computing environment based on disk specifications. In one example, components of management node 102 may be implemented as engines or modules comprising any combination of hardware and programming to implement the functionalities described herein.

An example implementation to deploy the virtual machine based on the disk specifications is described below. Deployment unit 124 may perform deployment of an application definition (e.g., Blueprint 116) into a selected deployment environment. In this example, deployment unit 124 may receive recommendation from compute processing unit 302, network processing unit 304, and storage entity determination unit 118 to select a specific cloud computing platform provider corresponding to the requirements of the user. Example blueprint 116 may represent the application definition with requirements/specifications about compute, storage, and network resources. The specifications of the storage resources may include a plurality of virtual disks with various disk specifications (e.g., disk requirements). An example blueprint 116 with example disk specifications/requirements is shown in FIG. 4.

Figure 4:
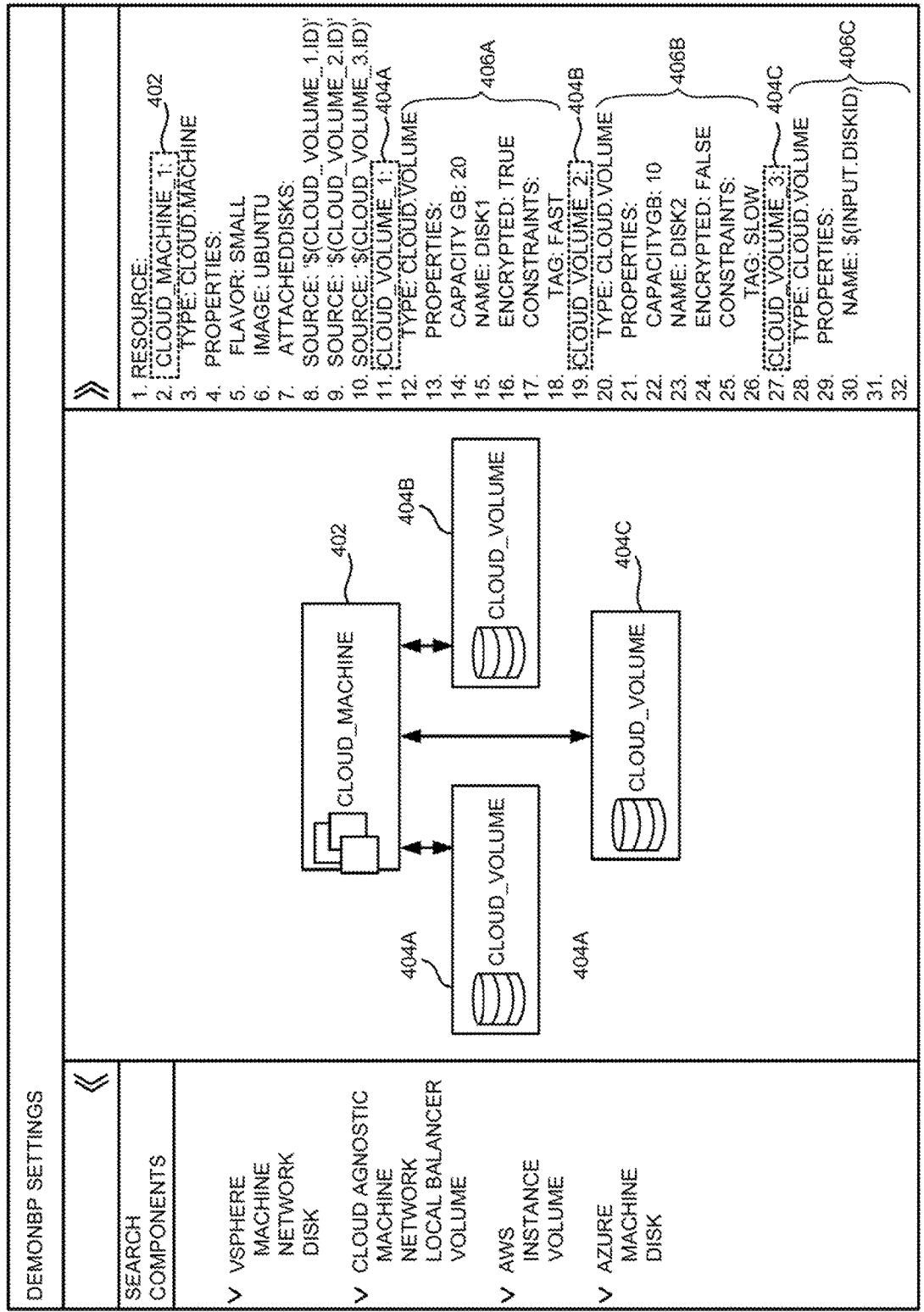
FIG. 4 is a graphical user interface (GUI) of an example blueprint depicting deployment information for deploying one or more instances of a virtual machine.

FIG. 4 is a graphical user interface (GUI) 400 of an example blueprint depicting deployment information for deploying one or more instances of a virtual machine 402. Example blueprint as shown in GUI 400 may have 3 virtual disks. Out of 3 virtual disks, virtual disks 404A and 404B are new disks that needs to be created and attached to the compute resource whereas virtual disk 404C is an existing virtual disk that needs to be attached to the compute resource.

Disk specifications may define the requirements/specifications of each virtual disk that will be attached to the virtual machine. Example disk specifications of the virtual disks may include:

Capacity: Size of the virtual disk in gigabyte (GB).
Encrypted: Represent whether the disk should be encrypted or not.
Persistent—Represents whether the disk should survive even after the virtual machine is deleted.
Constraints—Represents various conditions which can be hard/soft that are requested as requirements during blueprint design.
Name—Name of the disk. If the name is in a first format (e.g., ${ } format), then the virtual disk is an existing disk that needs to be attached to the newly created virtual machine.

In the example shown in FIG. 4, disk specifications 406A (e.g., a type, capacity, name, encrypted, constraints, and the like) may be defined for virtual disk 404A and disk specifications 406B may be defined for virtual disk 404B, and disk specifications 406C may be defined for virtual disk 404C. For example, the constraint for virtual disk 404A may be defined with a "fast" tag, and the constraint for virtual disk 404B may be defined with a "slow" tag, and virtual disk 404C is an existing disk. Thus, disk specifications 406A, 406B, and 406C may be predefined in the blueprint by a user (e.g., an administrator).

Referring back to FIG. 3, storage entity determination unit 118 may retrieve/extract the disk specifications (e.g., 406A-406C as shown in FIG. 4) for the various virtual disks (e.g., 404A-404C as shown in FIG. 4) in the form of constraints and match each of the tags (e.g., fast or slow for constraints, true or false for encryption, and the like) to the storage profiles (e.g., tags defined in the storage profiles). Each requirement/disk specification on the virtual disk can be hard constraint or soft constraint. If the disk specification is a hard constraint and if the storage profile doesn't satisfy the constraint, then the request may fail. If the disk specification is a soft constraint, then the request may not fail and may continue with the system defaults for provisioning the virtual disk. Thus, the disk specifications may refer to user defined hints that can be mapped to capabilities that are supported by the storage entities in the deployment environments. An example storage profile is depicted in FIGS. 5A and 5B.

FIG. 5A illustrates a screenshot 500A, depicting example cloud specific properties that are captured in the storage profile. In one example, the storage profile may refer to a collection of predefined storage items related to a specific deployment environment (e.g., corresponding to a client). Further, the storage profile may define details used for customizing the virtual disk provisioning. The storage profile may be tagged with various tags which represent the characteristics of the storage profile either manually or through auto populating from the deployment environment. For example, in a VMware vSphere® endpoint, a set of tags associated with a datastore can be fetched automatically and can be provided as the characteristics of the storage profile. In the example shown in FIG. 5A, the storage profile is tagged with "fast" as shown by 502 and is associated with a datastore 504 (e.g., datastore link "SHARED_VCO_D-GC_DEV1") compatible with a storage policy 506. Similarly, any number of tags can be defined either manually or automatically corresponding to the storage profile based on capabilities of the storage entities.

Figure 5B:
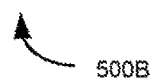
FIG. 5B illustrates another example screenshot, depicting example cloud specific properties that are captured in the storage profile.

FIG. 5B illustrates a screenshot 500B, depicting another example cloud specific properties that are captured in multiple storage profiles 552 and 554. FIG. 5B depicts multiple storage profiles 552 and 554 that are tagged with "fast" and "slow" as shown by 556 and 558. In this example, storage profile 552 may be associated with a datastore 560 compatible with a storage policy 562 and storage profile 554 may be associated with an independent datastore 564 (i.e., datastore that is not part of any cluster). Thus, multiple storage profiles 552 and 554 can be created against various deployment environments that are provided by the cloud computing platform providers.

Figure 6A:
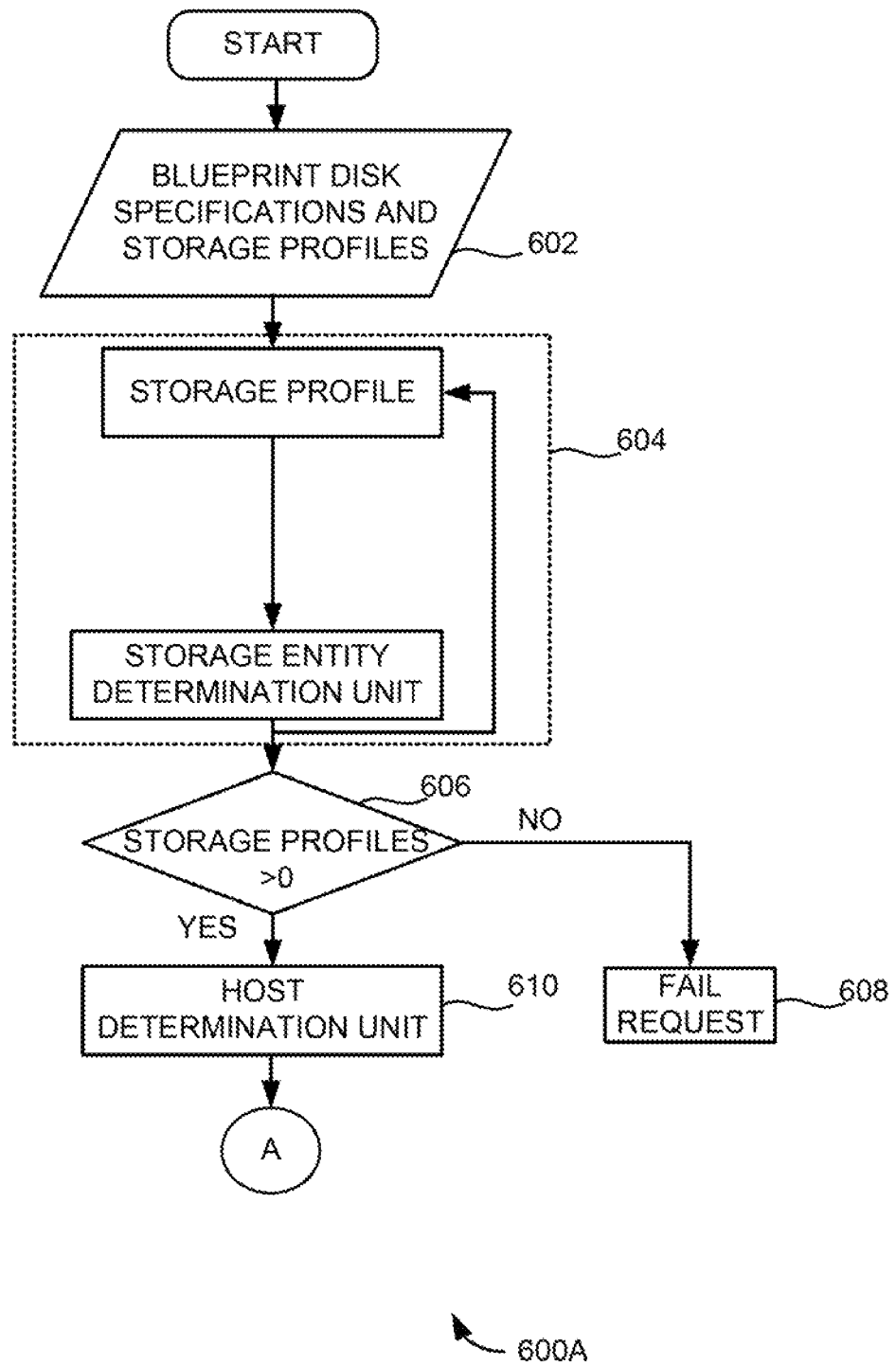
FIG. 6A illustrates an example process to determine datastore, datastore cluster, and/or storage policy based on matching of the disk specifications and storage profiles.

Referring back to FIG. 3, storage entity determination unit 118 may match each disk specification associated with the storage profiles to find a suitable match. In one example, storage entity determination unit 118 may iterate over each storage profile and perform the filtering process (e.g., as shown in FIG. 6A). When there is a storage profile which satisfies the requirements of the virtual disk, then storage entity determination unit 118 may determine the properties such as datastore, datastore cluster, and/or storage policy defined in the matched storage profile and map to the virtual disk that is requesting this requirement. When none of the storage profiles satisfy the requirements, then the provisioning of disk may be failed.

Storage entity determination unit 118 may provide the determined datastore, datastore cluster, and/or storage policy corresponding to the virtual disks to host determination unit 122 to find the suitable host computing system which is connected to all of these storage entities. In addition, compute processing unit 302 may determine a processor resource availability and a memory resource availability of host computing systems and provide this information to host determination unit 122. Network processing unit 304 may determine network connectivity between the host computing systems and the plurality of storage entities and provide this information to host determination unit 122. In this example, host determination unit 122 may be communicatively coupled to compute processing unit 302, network processing unit 304, and storage entity determination unit 118 to determine the host computing system that has connectivity to the candidate storage entities with available storage, and having available processor and memory resources to deploy the virtual machine (e.g., using compute filtering unit 306, network filtering unit 308, and storage filtering unit 310).

In one example implementation, host determination unit 122 may apply compute and/or network filter (e.g., using compute filtering unit 306 and/or network filtering unit 308), if any, to filter the host computing systems from all the available host computing systems. For example, compute filtering unit 306 may filter the host computing systems based on compute resource availability of the host computing systems, and network filtering unit 308 may filter the host computing systems based on network connectivity between the host computing systems and the storage entities. Now this list of filtered host computing systems can be fed as input to storage filtering unit 310.

Further with respect to the above example, host determination unit 122 may use storage filtering unit 310 to determine whether the disk's datastore, datastore cluster, or storage policy has the connectivity to the host computing systems to find the suitable host computing system based on the input list of available host computing systems and the list of virtual disks.

In the cloud computing environment, a host computing system may have the topology information related to all the datastores that the host computing system is connected to. Further, a datastore may include the information of which datastore cluster the datastore belongs to, if any, and references (e.g., links) to the storage policies to which the datastore belongs to, if any. Host determination unit 122 may collect all this information from the cloud computing environment and determine whether the datastore, datastore cluster, and/or storage policy has the connectivity to the host computing system as explained in examples processes of FIGS. 6A and 6B.

FIG. 6A illustrates an example process 600A to determine datastore, datastore cluster, and/or storage policy based on matching of the disk specifications and storage profiles. A blueprint with a number of disks with various requirements/user hints along with compute may be created. Further, storage profiles may be created for each of the endpoints which represents the capabilities of the cloud computing service providers. As shown in FIG. 6A, at 602, the disk specifications and storage profiles may be inputted to storage entity determination unit for further processing. At 604, the storage entity determination unit may iterate over each storage profile to determine properties such as datastore, datastore cluster, and storage policy that satisfies the requirements of the virtual disks.

At 606, a check is made to determine whether there is any storage profile that satisfies the requirements of the virtual disks. When none of the storage profiles satisfy the requirements of the virtual disks, then the provisioning of disk may be failed (e.g., as shown in 608).

When there are one or more storage profiles that satisfies the requirements of the virtual disks, then the storage entity determination unit may provide the determined datastore, datastore cluster, and/or storage policy information corresponding to the virtual disks to the host determination unit to find a suitable host computing system which can connect to all of such storage entities (e.g., at 610).

Figure 6B:
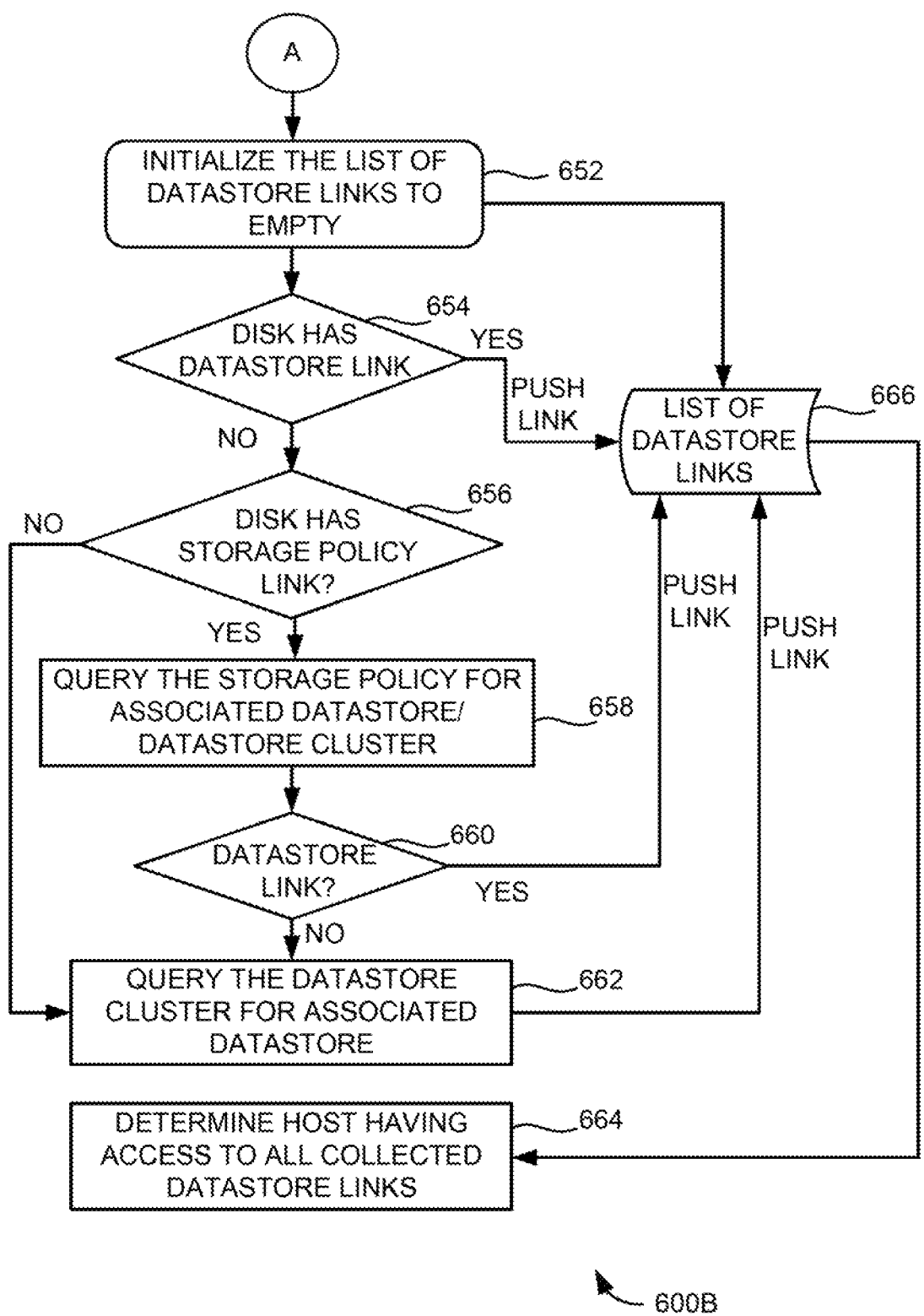
FIG. 6B illustrates an example process to determine storage entities associated with the datastores, datastore clusters, and/or storage policies.

FIG. 6B illustrates an example process 600B to determine storage entities associated with the datastores, datastore clusters, and/or storage policies. At 652, a list of datastores links 666 may be initialized as empty. In one example, the steps 654 to 662 may be repeated for each of the virtual disks as follows. At 654, a check is made to determine whether the virtual disk has the datastore information where the virtual disk should land into. If there is a datastore information, then the datastore information may be pushed to the list of datastore links 666.

If there is no datastore information, at 656, a check is made to determine whether the virtual disk has a storage policy link. At 658, the storage policy may be queried to determine the datastores or datastore clusters that are related to the storage policy. At 660, a check is made to determine whether the result of step 658 is a datastore or datastore cluster. If the result is of type datastore, then the datastore information may be pushed to the list of datastore links 666.

If the virtual disk does not have the storage policy or if the result of 660 is of type datastore cluster, then the datastore cluster may be queried to determine the datastores related to the datastore cluster, at 662. Then, the datastore information may be pushed to the list of datastore links 666. This process is repeated for all the storage profiles that satisfies the requirements of the virtual disks.

At 664, one or more host computing systems that has connectivity to all the datastores in the list of datastore links 666 may be determined by querying the host computing systems (i.e., via determining whether the datastore links in the list is present in any of the host computing systems). The virtual machine may be deployed on one of the determined host computing systems that has connectivity to all the datastores in the list and having available processor and memory resources. In this example, available storage of the datastores in the list can also be considered for deploying the virtual machine. If there are any existing disks, which are to be attached to the newly created virtual machine, then the datastore of the already created disks may also be considered for determining the host computing system.

Figure 7A:
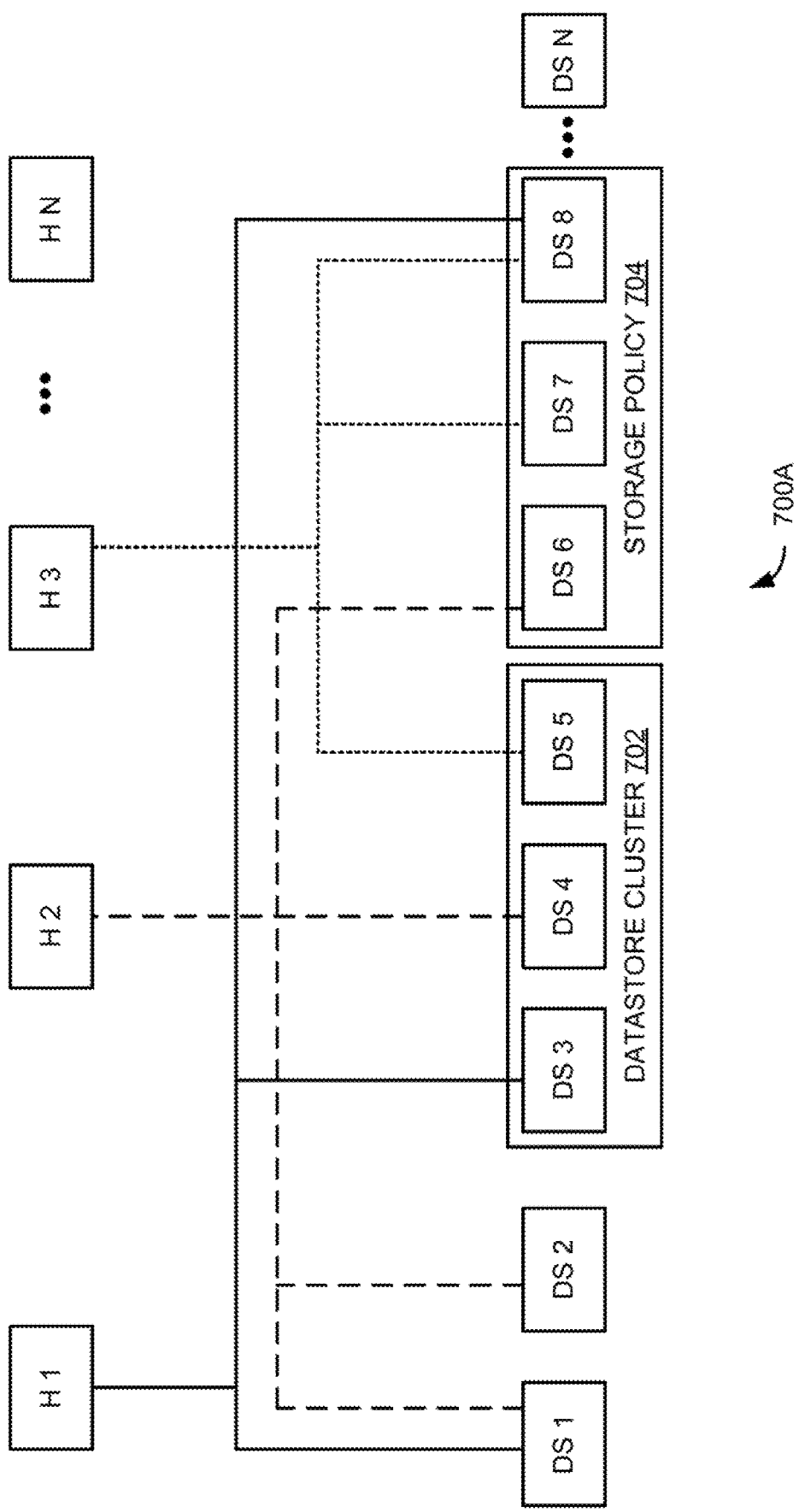
FIGS. 7A and 7B illustrate example cloud computing environments, depicting an example connectivity between host computing systems and corresponding datastores.

FIG. 7A is an example cloud computing environment 700A, depicting an example connectivity between host computing systems H1-HN and corresponding datastores DS1-DSN. In this example, host computing systems H1-HN may be connected to a respective one of datastores DS1-DSN, which can be independent datastores, part of datastore clusters (e.g., 702), or compatible with storage policies (e.g., 704). Consider that the storage entities that support the retrieved disk specifications may be determined as datastores DS2, DS4 (e.g., part of datastore cluster 702), and DS6 (e.g., compatible with storage policy 704), for instance, using the process 600B of FIG. 6B. As shown in the FIG. 7A, host computing system H2 has connectivity to the datastores DS2, DS4, and DS6. Therefore, host computing system H2 can be considered/selected for placing the virtual machine.

Figure 7B:
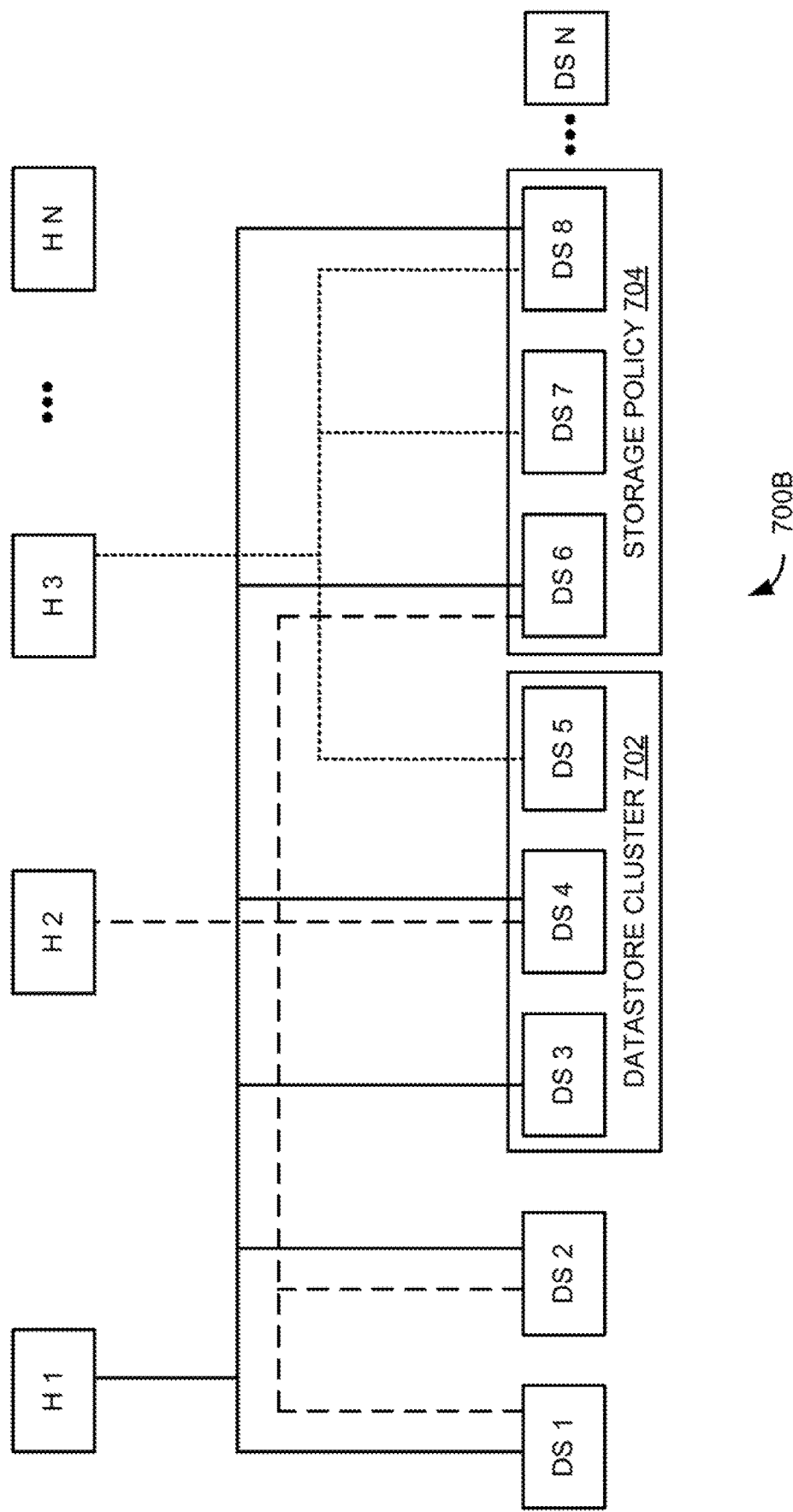

FIG. 7B is another example cloud computing environment 700B, depicting an example connectivity between host computing systems H1-HN and corresponding datastores DS1-DSN. Consider that the storage entities that support the retrieved disk specifications may be determined as datastores DS2, DS4, and DS6, for instance, using the process 600B of FIG. 6B. As shown in the FIG. 7B, host computing systems H1 and H2 has connectivity to the datastores DS2, DS4, and DS6. Therefore, host computing systems H1 and H2 can be considered/selected for placing the virtual machine. In this example, the virtual machine can be placed on one of host computing systems H1 and H2 based on computing resource availability and network resource availability of host computing systems H1 and H2. Similarly, storage resource availability of the datastores can also be considered for placing the virtual machine on the host computing system.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 8:
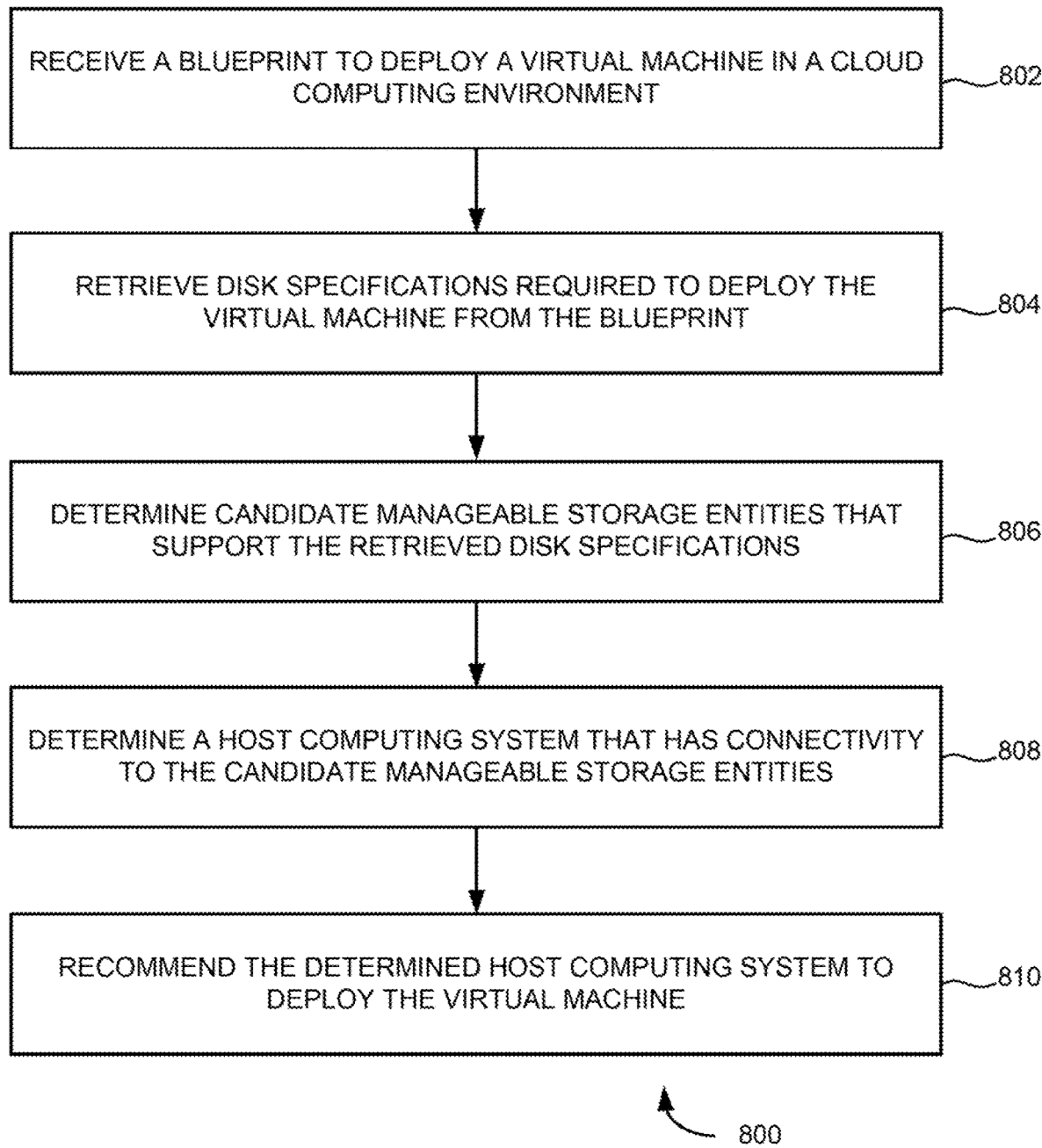
FIG. 8 illustrates a flow diagram of an example method for deploying virtual machines based on disk specifications.

FIG. 8 illustrate a flow diagram 800 of an example method for deploying virtual machines based on disk specifications. It should be understood that the process depicted in FIG. 8 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 802, a blueprint to deploy a virtual machine in a cloud computing environment may be received. Example blueprint may include specifications of compute resources, network resources, and storage resources. In this example, the specifications of the storage resources may include a plurality of virtual disks with various disk specifications.

At 804, disk specifications required to deploy the virtual machine may be retrieved from the blueprint. At 806, candidate storage entities that support the retrieved disk specifications may be determined. In one example, determining the candidate storage entities that support the retrieved disk specifications may include:

retrieving storage profiles (e.g., predefined storage profiles) associated with a plurality of storage entities from a storage-profile repository.

matching the retrieved disk specifications with the retrieved storage profiles. In one example, predefined tags associated with the retrieved disk specifications may be matched with the retrieved storage profiles (e.g., predefined tags of the storage profiles).

determining the candidate storage entities that support the retrieved disk specifications based on the matching.

For example, the candidate storage entities can be selected from datastores, datastores that are associated with datastore clusters, datastores that are compatible with storage policies, or any combination thereof. In this example, each matched storage profile may include a link to a datastore, datastore cluster, or a storage policy. In this example, the candidate storage entities that support the retrieved disk specifications may be determined as follows:

For each storage entity:

when a storage entity that supports a retrieved disk specification is a datastore (i.e., the matched storage profile includes datastore information/link), then the datastore can be determined as a candidate storage entity, when the storage entity that supports the retrieved disk specification is associated with a storage policy (i.e., the matched storage profile includes storage policy information/link), then the storage policy may be queried to obtain the datastore or a datastore cluster and the obtained datastore associated with the storage policy may be determined as the candidate storage entity, and when the storage entity that supports the retrieved disk specification is associated with the datastore cluster (i.e., the matched storage profile includes datastore information/link), then the datastore cluster may be queried to obtain the datastore and the obtained datastore associated with the datastore cluster may be determined as the candidate storage entity.

At 808, a host computing system that has connectivity to the candidate storage entities may be determined. In one example, each disk specification in the blueprint may be mapped to at least one candidate storage entity, The, the host computing system that has connectivity to each of the mapped candidate storage entities may be determined.

In another example, when there is any existing virtual disk that needs to be attached to the virtual machine based on the blueprint, then a virtual disk in the cloud computing environment that needs to be attached to the virtual machine may be determined using the blueprint, a storage entity associated with the virtual disk may be determined, and the host computing system that has connectivity to the candidate storage entities and the storage entity associated with the virtual disk may be determined.

At 810, the determined host computing system may be recommended to deploy the virtual machine. Further, the virtual machine may be deployed on the host computing system in accordance with the recommendation.

Figure 9:
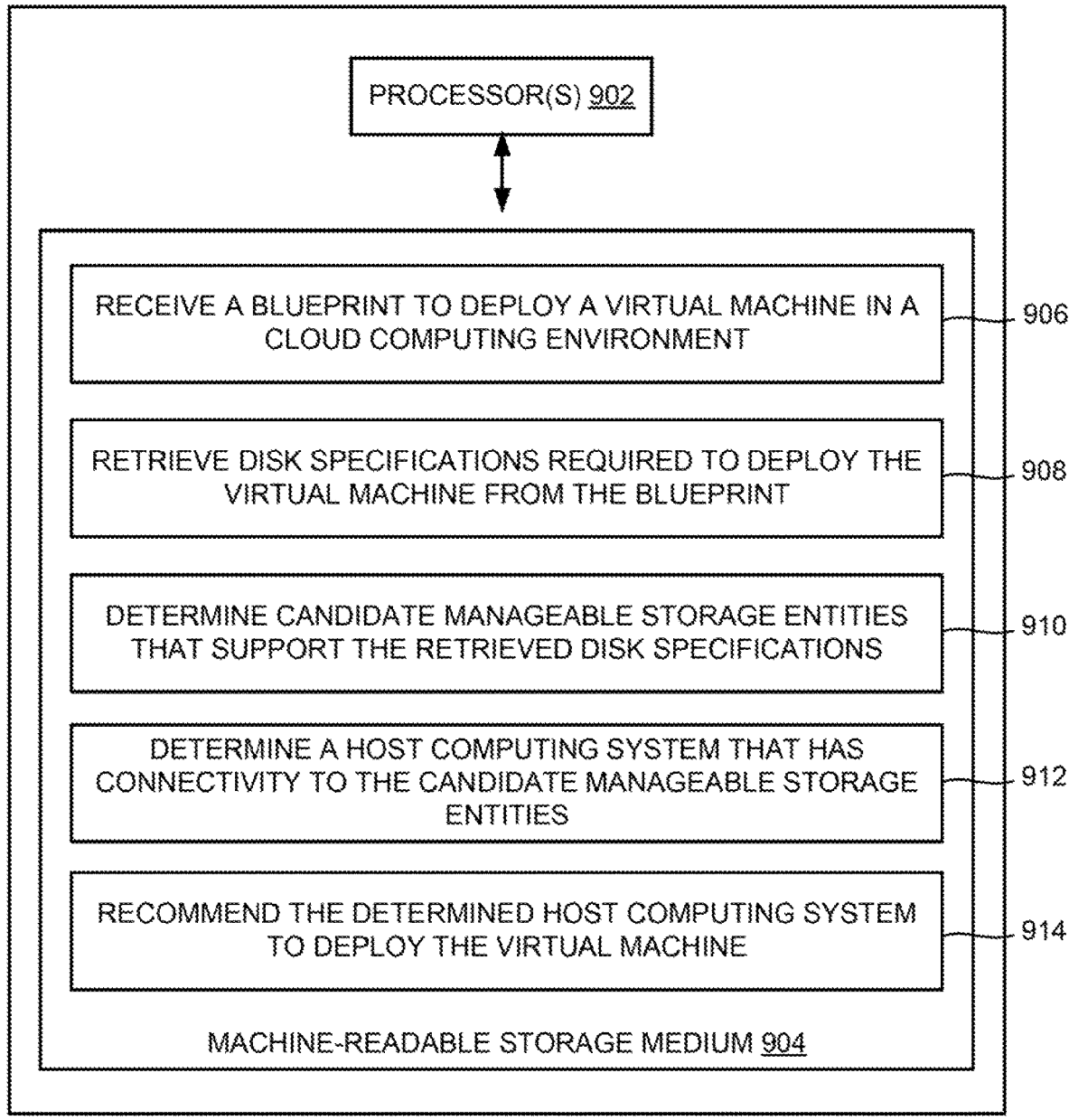
FIG. 9 is a block diagram of an example server including non-transitory computer-readable storage medium storing instructions to deploy virtual machines based on disk specifications.

FIG. 9 is a block diagram of an example server 900 including non-transitory machine-readable storage medium 904 storing instructions to deploy virtual machines based on disk specifications. Server 900 (e.g., management node 102 of FIG. 1) includes a processor 902 and machine-readable storage medium 904 communicatively coupled through a system bus. Processor 902 may be any type of central processing unit (CPU), microprocessor, or processing logic that interprets and executes machine-readable instructions stored in machine-readable storage medium 904. Machine-readable storage medium 904 may be a random-access memory (RAM) or another type of dynamic storage device that may store information and machine-readable instructions that may be executed by processor 902. For example, machine-readable storage medium 904 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 904 may be a non-transitory machine-readable medium. In an example, machine-readable storage medium 904 may be remote but accessible to server 900.

Machine-readable storage medium 904 may store instructions 906-914 that can be executed by processor 902. Instructions 906 may be executed by processor 902 to receive a blueprint to deploy a virtual machine in a cloud computing environment. Instructions 908 may be executed by processor 902 to retrieve disk specifications required to deploy the virtual machine from the blueprint.

Instructions 910 may be executed by processor 902 to determine candidate storage entities that support the retrieved disk specifications. Instructions 912 may be executed by processor 902 to determine a host computing system that has connectivity to the candidate storage entities. Instructions 914 may be executed by processor 902 to recommend the determined host computing system to deploy the virtual machine. Machine-readable storage medium 904 may further store instructions to deploy the virtual machine on the host computing system in accordance with the recommendation.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
   receiving a blueprint to deploy a virtual machine in a cloud computing environment;
   retrieving disk specifications required to deploy the virtual machine from the blueprint;
   retrieving storage profiles associated with a plurality of storage entities from a storage-profile repository;
   matching the retrieved disk specifications with the retrieved storage profiles by iterating over each storage profile to determine a datastore, a datastore cluster, and/or a storage policy that satisfies the retrieved disk specifications;
   determining candidate storage entities, associated with the datastore, the datastore cluster, and/or the storage policy, that support the retrieved disk specifications based on the matching, wherein the candidate storage entities are selected from a group consisting of datastores, datastores that are associated with datastore clusters, and datastores that are compatible with storage policies, and wherein determining the candidate storage entities that support the retrieved disk specifications comprises:
   for each storage entity:
   when a storage entity that supports a retrieved disk specification is the datastore, determining the datastore as a candidate storage entity;
   when the storage entity that supports the retrieved disk specification is associated with the storage policy, querying the storage policy to obtain a datastore or a datastore cluster and determining the obtained datastore associated with the storage policy as the candidate storage entity; and
   when the storage entity that supports the retrieved disk specification is associated with the datastore cluster, querying the datastore cluster to obtain a datastore and determining the obtained datastore associated with the datastore cluster as the candidate storage entity;
   determining a host computing system that has connectivity to the candidate storage entities; and
   recommending the determined host computing system to deploy the virtual machine.

2. The method of claim 1, further comprising:
   deploying the virtual machine on the host computing system in accordance with the recommendation.

3. The method of claim 1, wherein matching the retrieved disk specifications with the retrieved storage profiles comprises:
   matching predefined tags associated with the retrieved disk specifications with the retrieved storage profiles associated with the plurality of storage entities.

4. The method of claim 1, further comprising:
   determining a processor resource availability and a memory resource availability of host computing systems in the cloud computing environment;
   determining network connectivity between the host computing systems and the plurality of storage entities in the cloud computing environment; and
   determining a storage resource availability of the candidate storage entities, wherein determining the host computing system that has connectivity to the candidate storage entities comprises:
   determining the host computing system that has connectivity to the candidate storage entities with available storage, and having available processor and memory resources to deploy the virtual machine.

5. The method of claim 1, wherein determining the host computing system that has connectivity to the candidate storage entities comprises:
mapping each disk specification in the blueprint to at least one candidate storage entity; and
determining the host computing system that has connectivity to each of the mapped candidate storage entities.

6. The method of claim 1, further comprising:
determining a virtual disk in the cloud computing environment that needs to be attached to the virtual machine using the blueprint;
determining a storage entity associated with the virtual disk; and
determining the host computing system that has connectivity to the candidate storage entities and the storage entity associated with the virtual disk.

7. The method of claim 1, wherein the blueprint comprises specifications of compute resources, network resources, and storage resources, and wherein the specifications of the storage resources comprise a plurality of virtual disks with various disk specifications.

8. The method of claim 1, wherein each of the disk specifications is selected from a group consisting of a storage-entity type, a storage-entity capacity, a data-reading rate, a data-writing rate, an access latency, an access failure rate, a failure frequency, support for data encryption, and a data persistency.

9. A management node comprising:
a storage-profile repository to store a plurality of storage profiles associated with a plurality of storage entities in a cloud computing environment;
a processor;
memory coupled to the processor, wherein the memory includes:
a storage entity determination unit communicatively coupled to the storage-profile repository, the storage entity determination unit to:
receive a blueprint to deploy a virtual machine in the cloud computing environment:
retrieve disk specifications required to deploy the virtual machine from the blueprint;
retrieve the storage profiles associated with the plurality of storage entities from the storage-profile repository;
match the retrieved disk specifications with the retrieved storage profiles by iterating over each storage profile to determine a datastore, a datastore cluster, and/or a storage policy that satisfies the retrieved disk specifications; and
determine candidate storage entities, associated with the datastore, the datastore cluster, and/or the storage policy, that support the retrieved disk specifications based on the matching, wherein the candidate storage entities are selected from a group consisting of datastores, datastores that are associated with datastore clusters, and datastores that are compatible with storage policies, and wherein to determine the candidate storage entities that support the retrieved disk specifications comprises:
for each storage entity:
when a storage entity that supports a retrieved disk specification is the datastore, determining the datastore as a candidate storage entity;
when the storage entity that supports the retrieved disk specification is associated with the storage policy, querying the storage policy to obtain a datastore or a datastore cluster and determining the obtained datastore associated with the storage policy as the candidate storage entity; and
when the storage entity that supports the retrieved disk specification is associated with the datastore cluster, querying the datastore cluster to obtain a datastore and determining the obtained datastore associated with the datastore cluster as the candidate storage entity;
a host determination unit to determine a host computing system that has connectivity to the candidate storage entities; and
a deployment unit in communication with the host determination unit to deploy the virtual machine on the host computing system.

10. The management node of claim 9, wherein the storage entity determination unit is to:
match predefined tags associated with the retrieved disk specifications with the retrieved storage profiles associated with the plurality of storage entities.

11. The management node of claim 9, wherein the host determination unit is to:
map each disk specification in the blueprint to at least one candidate storage entity; and
determine the host computing system that has connectivity to each of the mapped candidate storage entities.

12. The management node of claim 9, wherein the storage entity determination unit is to:
determine a virtual disk in the cloud computing environment that needs to be attached to the virtual machine using the blueprint; and
determine a storage entity associated with the virtual disk, and wherein the host determination unit is to:
determine the host computing system that has connectivity to the candidate storage entities and the storage entity associated with the virtual disk.

13. The management node of claim 9, wherein the memory further comprises:
an application-blueprint-generation unit to generate the blueprint with specifications of compute resources, network resources, and storage resources, wherein the specifications of the storage resources comprise a plurality of virtual disks with various disk specifications.

14. The management node of claim 9, wherein the memory further comprises:
a compute processing unit to determine a processor resource availability and a memory resource availability of host computing systems in the cloud computing environment; and
a network processing unit to determine network connectivity between the host computing systems and the plurality of storage entities in the cloud computing environment,
wherein the host determination unit is communicatively coupled to the compute processing unit, the network processing unit, and the storage entity determination unit to determine the host computing system that has connectivity to the candidate storage entities with available storage, and having available processor and memory resources to deploy the virtual machine.

15. A non-transitory machine-readable storage medium encoded with instructions that, when executed by a server in a cloud computing environment, cause the server to:
receive a blueprint to deploy a virtual machine in the cloud computing environment;

retrieve disk specifications required to deploy the virtual machine from the blueprint;
retrieve storage profiles associated with a plurality of storage entities from a storage-profile repository;
match the retrieved disk specifications with the retrieved storage profiles by iterating over each storage profile to determine a datastore, a datastore cluster, and/or a storage policy that satisfies the retrieved disk specifications;
determine candidate storage entities, associated with the datastore, the datastore cluster, and/or the storage policy, that support the retrieved disk specifications based on the matching, wherein the candidate storage entities are selected from a group consisting of datastores, datastores that are associated with datastore clusters, and datastores that are compatible with storage policies, and wherein instructions to determine the candidate storage entities that support the retrieved disk specifications comprise instructions to:
for each storage entity:
when a storage entity that supports a retrieved disk specification is the datastore, determine the datastore as a candidate storage entity;
when the storage entity that supports the retrieved disk specification is associated with the storage policy, query the storage policy to obtain a datastore or a datastore cluster and determine the obtained datastore associated with the storage policy as the candidate storage entity; and
when the storage entity that supports the retrieved disk specification is associated with the datastore cluster, query the datastore cluster to obtain a datastore and determine the obtained datastore associated with the datastore cluster as the candidate storage entity;
determine a host computing system that has connectivity to the candidate storage entities; and
recommend the determined host computing system to deploy the virtual machine.

16. The non-transitory machine-readable storage medium of claim 15, further comprising instructions to:
deploy the virtual machine on the determined host computing system in accordance with the recommendation.

17. The non-transitory machine-readable storage medium of claim 15, wherein instructions to match the retrieved disk specifications with the retrieved storage profiles comprise instructions to:
match predefined tags associated with the retrieved disk specifications with the retrieved storage profiles associated with the plurality of storage entities.

18. The non-transitory machine-readable storage medium of claim 15, wherein instructions to determine the host computing system that has connectivity to the candidate storage entities comprise instructions to:
map each disk specification in the blueprint to at least one candidate storage entity; and
determine the host computing system that has connectivity to each of the mapped candidate storage entities.

* * * * *